(12) United States Patent
Gkinosatis

(10) Patent No.: US 12,128,655 B2
(45) Date of Patent: Oct. 29, 2024

(54) LINER FILM

(71) Applicant: FLEXOPACK S.A., Koropi (GR)

(72) Inventor: Dimitris Gkinosatis, Koropi Attica (GR)

(73) Assignee: FLEXOPACK S.A., Koropi (GR)

( * ) Notice: Subject to any disclaimer, the term of this patent is extended or adjusted under 35 U.S.C. 154(b) by 0 days.

(21) Appl. No.: 17/385,730

(22) Filed: Jul. 26, 2021

(65) Prior Publication Data

US 2022/0153005 A1 May 19, 2022

Related U.S. Application Data

(63) Continuation of application No. 15/455,170, filed on Mar. 10, 2017, now abandoned.

(30) Foreign Application Priority Data

Mar. 10, 2016 (EP) .................................... 16159657

(51) Int. Cl.
| | |
|---|---|
| B32B 27/32 | (2006.01) |
| B32B 1/08 | (2006.01) |
| B32B 27/08 | (2006.01) |
| B32B 27/28 | (2006.01) |
| B32B 27/30 | (2006.01) |
| B32B 27/34 | (2006.01) |
| B32B 27/36 | (2006.01) |
| B65D 65/40 | (2006.01) |

(52) U.S. Cl.
CPC ............. *B32B 27/32* (2013.01); *B32B 1/08* (2013.01); *B32B 27/08* (2013.01); *B32B 27/285* (2013.01); *B32B 27/306* (2013.01); *B32B 27/34* (2013.01); *B32B 27/36* (2013.01); *B65D 65/40* (2013.01); *B32B 2270/00* (2013.01); *B32B 2307/50* (2013.01); *B32B 2307/70* (2013.01); *B32B 2307/71* (2013.01); *B32B 2307/7244* (2013.01); *B32B 2439/70* (2013.01)

(58) Field of Classification Search
CPC .................. B32B 1/08; B32B 2270/00; B32B 2307/50; B32B 2307/70; B32B 2307/71; B32B 2307/7244; B32B 2439/70; B32B 27/08; B32B 27/285; B32B 27/306; B32B 27/32; B32B 27/34; B32B 27/36; B65D 65/40

See application file for complete search history.

(56) References Cited

U.S. PATENT DOCUMENTS

| | | |
|---|---|---|
| 5,205,650 A | 4/1993 | Rasmussen |
| 5,532,053 A | 7/1996 | Mueller |
| 2005/0089682 A1 | 4/2005 | Su et al. |
| 2008/0274314 A1 | 11/2008 | Gkinosatis |
| 2009/0191392 A1 | 7/2009 | Gkinosatis |
| 2011/0281096 A1 | 11/2011 | Enzinger et al. |
| 2012/0141744 A1 | 6/2012 | Ambroise et al. |

FOREIGN PATENT DOCUMENTS

| | | |
|---|---|---|
| DE | 10345839 A1 | 4/2005 |
| EP | 1273425 A1 | 1/2003 |
| JP | 2003334909 A | 11/2003 |

OTHER PUBLICATIONS

Myer "Handbook of Materials Selection" Section 32.4 "Film Blowing" p. 973-974, John Wiley & Sons, 2002.*

* cited by examiner

*Primary Examiner* — Yan Lan
(74) *Attorney, Agent, or Firm* — ArentFox Schiff LLP

(57) ABSTRACT

The invention relates to gusseted plastic film with a thickness of 50 to 200 microns, comprising a polyolefin homopolymer or copolymer, a polyether copolymer and a layer comprising oxygen barrier polymer.

12 Claims, No Drawings

LINER FILM

CROSS REFERENCE OF RELATED PATENT APPLICATIONS

This patent application is a continuation patent application of U.S. patent application Ser. No. 15/455,170, filed Mar. 10, 2017, entitled "LINER FILM," which claims priority to EP Patent Application EP 16159657.2, filed Mar. 10, 2016, the entire contents of which are herein incorporated by reference.

The invention relates to gusseted plastic film with a thickness of 50 to 200 microns, comprising a polyolefin homopolymer or copolymer, a polyether copolymer and a layer comprising oxygen barrier polymer.

BACKGROUND

Plastic containers have been increasingly used in packaging applications, such as "food packaging". A typical plastic container often used for bulk packaging of food (eg powdery food, coffee, cocoa, nuts) is called FIBC (=flexible intermediate bulk container). This type of container often is a woven polyethylene or polypropylene.

In the inside or outside of the woven material, another plastic liner is often used. This liner is monolayer or multilayer and comprises polymer materials. There are different types of adherence of this liner to the outer woven liner as seen in the prior art documents eg U.S. Pat. No. 6,374,579.

In the case of multilayer, the different layers offer different advantages to the final applications. The inside layer (=the layer coming into direct contact with the food packed) is often formulated to allow very good sealing, thus protecting from the existence of leakers that would be detrimental for the packed product. Other layers may comprise abuse resistant polymers to increase the mechanical strength of the material.

In case of oxygen sensitive food materials, at least one layer of the multilayer construction comprises material which is impermeable to oxygen. As it is well known in the art, such materials are often polyamides, PVDC or EVOH.

It is very often the case that the multilayer film is in "gusseted tube" configuration. The reason is that this configuration is more practical for bulk filling, transport and unloading versus a simple tube.

Gussets are produced in line with the process by the use of two "pleating constructions" (often wooden or metal boards) which the film follows. As these multilayer tube materials are often produced with the "hot blown film" method which involves rotation of the collapsing frame-nip roll section, a common problem is that creases are present continuously or periodically following the rotation and this increases the scrap and lowers the efficiency of the operation. There are cases where the creases are so often that the tubular film cannot be processed into a gusseted tube.

It is generally known in the art that less stiff polymers eg LDPE have better gussetability versus stiffer ones like HDPE. It is believed that the material must be softer and more pliable in order to form efficiently a gusset during the production process. High barrier materials such as EVOH or polyamide make the gusseting process even more difficult as they are usually stiffer than polyolefins.

There is a need to improve the gussetability of the plastic structure ie to find materials pliable enough and with enough bubble stability to produce gussets with no creases in the commonly used thickness range of 50-200 microns without sacrificing the oxygen barrier properties of the plastic film.

SUMMARY OF THE INVENTION

It has been unexpectedly found that the addition of polyether copolymers in blends with polyolefins improve very much the gussetability of oxygen barrier plastic films.

According to the invention a very suitable film for the FIBC liner has an average thickness of 50-200, preferably 60 to 130 microns and comprises
  a polyolefin homopolymer or copolymer
  a polyether copolymer
  an oxygen barrier material such as EVOH (ethylene vinyl alcohol), polyamide or PVDC Further preferred options of the invention will be explained in the detailed description of the invention.

Definitions

In this application the following definitions are used:

The term "gusset" is interpreted as well known in the art. That is a plastic tubular film having a partial 4 fold configuration.

The term "film" refers to a flat or tubular flexible structure of thermoplastic material. This term also refers to a film having a multilayer structure (such as outer layer, inner layer, oxygen barrier layer, tie layer, intermediate layer etc.). As such, the number and configuration of the layers is not limited.

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither outer nor inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" includes all the polymers produced by polymerization of olefins. Polyethylene, polypropylene, polybutylene and other products are included in this general category. Preferably, the polyolefin is polyethylene or polypropylene.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

In these cases the alpha olefin can be propene, butene, hexene, octene etc as known in the art.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%. Abbreviation used is EMA.

As used herein the phrase "ethylene vinyl acetate copolymer" refers to copolymers of ethylene and vinyl acetate. Abbreviation used is EVA.

As used herein the term "oxygen barrier polymer" refers to polymers that do not allow the ingress of oxygen in packs. Typical materials are polyamide, EVOH or PVDC.

As used herein, the term EVOH refers to saponified products of ethylene vinyl ester copolymers. The ethylene content is typically in the range of 25 to 50% per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers that include amide linkages as well known in the art.

As used herein the term "ionomer" refers to ethylene-acid copolymers which have been neutralized by metals such as sodium, zinc, lithium or others.

The acid used is usually methacrylic or acrylic acid.

As used herein, the term "ethylene acid copolymer" refers to copolymers of ethylene with acid, most usually methacrylic or acrylic acid.

As used herein, the term "polyester" includes crystalline polymers, amorphous polymers and polyester elastomers. Common polyesters are crystalline PET (polyethylene terephthalate), amorphous PET, PETG (glycol modified polyethylene terephthalate), PBT (polybutylene terephthalate), PTT (polytrimethylene terephthalate), PBN (polybutylene naphthalate), PEN (polyethylene naphthalate), polyester-ether block copolymers and polyester-ester block copolymers of hard and soft blocks.

Other polyester materials are also included in the above definition.

As used herein the term "polybutylene" refers to butene-1 homopolymers and copolymers. Useful copolymers comprise ethylene mer units. Ethylene content should be generally less than 50%.

All measurement methods mentioned herein are readily available for the skilled person. For example, they can be obtained from the American National Standards Institute at: www.webstore.ansi.org All percentages used are per weight unless stated otherwise.

DETAILED DESCRIPTION OF THE INVENTION

The present invention in a preferred version is a film comprising
a polyolefin homopolymer or copolymer
a polyether copolymer
an oxygen barrier material.

In a further preferred version, the film is in the form of gusseted tube.

In a still further preferred version the average thickness of the film is in the range 50-200 microns, preferably 60-150 microns, more preferably 60-130 microns.

In a further preferred version the polyolefin homopolymer or copolymer is an ethylene alpha olefin copolymer. In a further preferred version the alpha olefin is butene, hexene or octene. In a further preferred version the ethylene alpha olefin copolymers are produced with metallocene catalysts.

Film Construction

Preferably the film comprises 5 to 15 layers, more preferably 7 to 12 layers.

A typical example of the film construction in 7 layer mode is
Outer layer/intermediate layer/tie layer/barrier layer/tie layer/intermediate layer/inner layer The film is preferably produced by the hot blown film method and is not heat shrinkable.

Barrier Layer(s)

The film in a preferable version contains high oxygen barrier materials so that it protects the components of the pack from the detrimental effect of oxygen ingress. EVOH is a preferred option but also polyamide and PVDC are viable alternatives. The EVOH is preferably 24 to 50% ethylene per mol, more preferably 27 to 48%.

In another preferred version of the invention, the barrier polymer is polyamide. Most suitable polyamides are polyamide 6 and copolymer 6/66 or 6/12.

Intermediate Layer(s)

Preferably, the intermediate layers comprise different polyolefins. Preferred polyolefins are ethylene alpha olefin copolymers, where alpha olefin is preferably butene, hexene or octene.

In a preferred version the ethylene alpha olefin copolymers are random copolymers with densities from 0.870 g/cm$^3$ up to 0.960 g/cm$^3$. In a further preferred version the molecular weight distribution of the ethylene alpha olefin copolymers are less than 10, preferably less than 5, preferably less than 3.

Tie Layer(s)

As well known in the art, there is no natural adhesion between polyolefins and oxygen barrier polymers such as EVOH.

Suitable materials for the tie layer process include maleic anhydride modified EVA, maleic anhydride modified polyethylene, maleic anhydride modified EMA, maleic anhydride modified elastomer, partially saponified EVA copolymer and polyurethane elastomer.

In the tie layers also polyamides can be used, given the strong natural adhesion between polyamide and EVOH. Preferred polyamides are polyamide 6, polyamide 6/66 and polyamide 6/12.

Outer Layer

The outer layer of the film preferably comprises ethylene alpha olefin copolymers and/or low density polyethylene (LDPE) produced by Ziegler Natta or metallocene catalyst. Polypropylene is also possible.

Inner Layer

The inner layer of the film would be able to seal the film to itself to secure that no leakers and oxygen influx is allowed. This could be detrimental to the product packed.

Suitable materials for the inner layer include different polyolefins, preferable ethylene alpha olefin copolymers, low density polyethylene or polypropylene.

In general, the above layers may comprise further well known in the art additives such as antiblock, slip, antifog, polymer processing enhancers and others.

Polyether Copolymers

We have unexpectedly noticed that by adding 5-25%, preferably 5-20% of polyether copolymers in at least one of outer and inner layers in a blend with polyolefin homopolymer or copolymer compounds, there is substantial improvement in the gussetability of the film. The film is nicely transformed inline to a gusseted tube without any creasing during the whole rotation of the collapsing frame.

Without wanted to be bound to any theory, we suspect that the addition of polyether copolymers to polyolefins improve the melt strength thus allowing easier gusset formations even with higher rotation ratio of the collapsing frame and blown film tower.

Preferred polyether copolymers are copolymers with polyolefins, polyamides or polyester. Typical materials are PEBAX from Arkema, IRGASTAT from BASF and PELESTAT from Sanyo.

In a preferred version the melting points of the polyether copolymers are in the range 100-180° C., preferably 110-170° C. If the melting temperatures are lower the gussetability is compromised by the higher friction due to polymer tackiness while if the melting temperatures are higher the sealing properties (often required) are compromised.

EXAMPLE 1

From a commercial hot blown film line we produced the following film

Outer layer, thickness 30 microns
Intermediate layer 1, thickness 10 microns
Tie layer 1, thickness 8 microns
EVOH 38%, thickness 8 microns
Tie layer 2, thickness 8 microns
Intermediate layer 2, thickness 20 microns
Inner layer, thickness 12 microns.
Outer layer was a blend of
89% LDPE+10% polyether polyamide copolymer+1% slip antiblock masterbatch. LDPE density was 0.923 while MFI was 0.75 under 190C/2.16 kilos Intermediate layer 1 was a blend of
60% ethylene hexene copolymer+40% LDPE
The density of ethylene hexene copolymer was 0.919 while MFI was 1 under 190° C./2.16 kilos LDPE was same as used in the outer layer.

Tie layer 1 was maleic anhydride LLDPE based copolymer

Tie layer 2 was similar to tie layer 1
Intermediate layer 2 was exactly the same as intermediate layer 1.
Inner layer was a blend of
89% metallocene LLDPE+10% polyether polyamide copolymer+1% slip antiblock masterbatch Metallocene LLDPE had a density of 0.918 while MFI was 1 under 190° C./2.16 kilos Polyether copolymer used was PEBAX 1074SA01, a copolymer of polyether and polyamide.

EXAMPLE 2

In the case of example 2 the LDPE used in the outer layer was replaced by the ethylene hexene copolymer used in intermediate layer 1.

EXAMPLE 3

In this example, the EVOH 38% was replaced by 32% which is stiffer and thought to be more difficult to form gusset.

COMPARATIVE EXAMPLE

The comparative example was like example 1 but with the polyether copolymer removed and replaced by LDPE (in the case of outer layer) and metallocene LLDPE in the case of inner layer.

EXAMINING SYSTEM

On the tower of the blown film line two gusset boards were mounted as known in the art. Each example structure ran in production for 2 hours and the number of creases was monitored. As the creases tend to come along in timely intervals, we recorded "creasing instances", meaning we recorded any incident when more than 3 creases passed from the nip section of the blown film line.

The rotation speed was kept constant during all this experiment.

RESULTS

Example 1 presented 0 creasing incident during the two hours production. Example 2 presented 1 creasing incidents. Example 3 presented 3 incidents.

The comparative example presented 12 incidents during the two hours production.

The invention claimed is:

1. A gusseted multilayer plastic film having gussets formed in-line via a blown film tower, said gusseted multilayer plastic film comprising:
   an outer layer of the multilayer plastic film,
   an inner layer of the multilayer plastic film,
   an oxygen barrier layer comprising an oxygen barrier material which is configured between said outer layer and said inner layer, wherein said oxygen barrier material is ethylene vinyl alcohol (EVOH) which contains 24 to 50% ethylene per mol, and
   an intermediate layer comprising ethylene alpha olefin copolymers and which is configured between said oxygen barrier layer and said outer layer or said inner layer,
   wherein the film comprises a blend of a polyolefin homopolymer or copolymer and a polyether copolymer contained in at least one of said outer layer and said inner layer;
   wherein the film is formed in a gusseted tube configuration when blown from a hot blown film line; and
   wherein 5-25 wt% of polyether copolymers are contained in at least one of the outer layer and the inner layer.

2. The plastic film of claim 1, wherein the thickness of the film is between 50 and 200 microns.

3. The plastic film of claim 2, wherein the thickness of the film is between 60 and 130 microns.

4. The plastic film of claim 1, wherein the polyolefin homopolymer or copolymer is polyethylene or polypropylene.

5. The plastic film of claim 1, wherein the polyolefin homopolymer or copolymer is ethylene alpha olefin copolymer.

6. The plastic film of claim 1, wherein the polyether copolymer is a block copolymer.

7. The plastic film of claim 1, wherein the polyether copolymer is polyolefin, polyamide or polyester copolymer.

8. The plastic film of claim 1, wherein the blend is contained in at least one of the outer layer or the inner layers.

9. The plastic film of claim 1, wherein the polyether copolymer is polyamide or polyester copolymer.

10. The plastic film of claim 1, wherein the blend of the polyolefin homopolymer or copolymer and the polyether copolymer is contained in both said outer layer and said inner layer.

11. The plastic film of claim 10, wherein the plastic film is in a gusseted tube configuration.

12. The gusseted multilayer plastic film of claim 1, wherein the plastic film is in a gusseted tube configuration.

* * * * *